US009729531B2

(12) United States Patent
He et al.

(10) Patent No.: US 9,729,531 B2
(45) Date of Patent: Aug. 8, 2017

(54) ACCESSING A COMPUTER RESOURCE USING AN ACCESS CONTROL MODEL AND POLICY

(71) Applicant: ORANGE, Paris (FR)

(72) Inventors: Ruan He, Issy les Moulineaux (FR); Xiangjun Qian, Issy les Moulineaux (FR)

(73) Assignee: Orange, Paris (FR)

( * ) Notice: Subject to any disclaimer, the term of this patent is extended or adjusted under 35 U.S.C. 154(b) by 57 days.

(21) Appl. No.: 14/313,993

(22) Filed: Jun. 24, 2014

(65) Prior Publication Data

US 2014/0380048 A1 Dec. 25, 2014

(30) Foreign Application Priority Data

Jun. 25, 2013 (FR) ...................... 13 56099

(51) Int. Cl.
*H04L 9/32* (2006.01)
*G06F 21/31* (2013.01)
*H04L 29/06* (2006.01)
*G06F 21/41* (2013.01)
*G06F 21/44* (2013.01)
*G06F 21/60* (2013.01)
(Continued)

(52) U.S. Cl.
CPC .............. *H04L 63/08* (2013.01); *G06F 21/31* (2013.01); *G06F 21/34* (2013.01); *G06F 21/41* (2013.01); *G06F 21/44* (2013.01); *G06F 21/604* (2013.01); *G06F 21/6218* (2013.01); *H04L 9/3226* (2013.01); *H04L 63/083* (2013.01); *H04L 63/0815* (2013.01); *H04L 2209/24* (2013.01)

(58) Field of Classification Search
CPC .......... G06F 21/31; G06F 21/34; G06F 21/41; G06F 21/44; G06F 21/60; G06F 21/604; G06F 21/62; G06F 21/6218; H04L 2209/24; H04L 29/06; H04L 63/08; H04L 63/0815; H04L 63/083; H04L 9/32; H04L 9/3226
See application file for complete search history.

(56) References Cited

U.S. PATENT DOCUMENTS 6,192,405 B1  2/2001  Bunnell
2004/0162786 A1*  8/2004  Cross ..................... G06F 21/33
                                                                    705/59
(Continued)

OTHER PUBLICATIONS

Bruce Schneier, Applied Cryptography, 2ed. (John Wiley & Sons 1996).*

(Continued)

*Primary Examiner* — Theodore C Parsons
(74) *Attorney, Agent, or Firm* — Knobbe Martens Olson & Bear LLP

(57) ABSTRACT

In one embodiment disclosed herein is a method of processing a request made by a terminal of a user to access a resource made available to a client entity by a platform of a cloud computer service supplier. The method is performed by a server situated between the terminal and the platform utilizing distinct instructions for each client entity. The method comprises verifying that the user is authorized to access the computer resource via the terminal by applying to the user and to the resource an access control model and an access control policy corresponding to the model.

25 Claims, 5 Drawing Sheets

(51) Int. Cl.
  *G06F 21/62* (2013.01)
  *G06F 21/34* (2013.01)

(56) References Cited

U.S. PATENT DOCUMENTS

| | | | | |
|---|---|---|---|---|
| 2006/0080352 A1* | 4/2006 | Boubez | H04L 63/08 | |
| 2006/0136990 A1* | 6/2006 | Hinton | H04L 63/0815 | 726/2 |
| 2009/0007097 A1* | 1/2009 | Hinton | G06F 8/61 | 717/176 |
| 2011/0265147 A1* | 10/2011 | Liu | H04L 63/08 | 726/4 |
| 2012/0011578 A1* | 1/2012 | Hinton | H04L 9/3228 | 726/8 |
| 2012/0117626 A1* | 5/2012 | Yates | H04L 63/101 | 726/4 |
| 2015/0058960 A1* | 2/2015 | Schmoyer | H04L 63/0807 | 726/8 |
| 2015/0310188 A1* | 10/2015 | Ford | G06F 21/10 | 726/28 |

OTHER PUBLICATIONS

Amazon Web Services, "AWS identity and access management using IAM." API Version May 8, 2010, retrieved Jan. 21, 2014 from http://awsdocs.s3.amazonaws.com/IAM/latest/iam-ug.pdf, 84 pages.

Amazon Web Services, "AWS security token service using temporary security credentials." API Version Jun. 15, 2011, retrieved Jan. 23, 2014 from http://awsdocs.s3.amazonaws.com/STS/latest/sts-ug/pdf, 59 pages.

Fugkeaw, Somchart. Aug. 22, 2012. "Achieving privacy and security in multi-owner data outsourcing." Digital Information Management (ICDIM), 2012 Seventh International Conference on, IEEE, pp. 239-244.

International Telecommunication Union (ITU). Feb. 2012. Focus Group on Cloud Computing Technical Report. Part 1: Introduction to the cloud ecosystem: definitions, taxonomies, use cases and high-level requirements. Version 1.0.

Kalam, et al. Jun. 6, 2003. "Organization based access control." IEEE Proceedings of the 4th International Workshop on Policies for Distributed Systems and Networks (POLICY '03), retrieved from http://ieeexplore.ieee.org/ie1x5/8577/27164/01206966.pdf?tp=&arnumber=1206966&isnumber=27164, pp. 1-12.

Sandhu, et al. 1996. "Role-based access control models." IEEE Computer, 29(2):38-47.

Thompson, et al. Certificate-based access control for widely distributed resources. Aug. 26, 1999, Proceedings of the 8th USENIX Security Symposium, Washington, D.C., retrieved Jan. 22, 2014 from http://static.usenix.org/publications/library/proceedings/sec99/full_papers/thompson/thompson.pdf, 14 pages.

French Preliminary Search Report dated Jan. 27, 2014, for French Patent Application No. 1356099 filed Jun. 23, 2013, 3 pages.

* cited by examiner

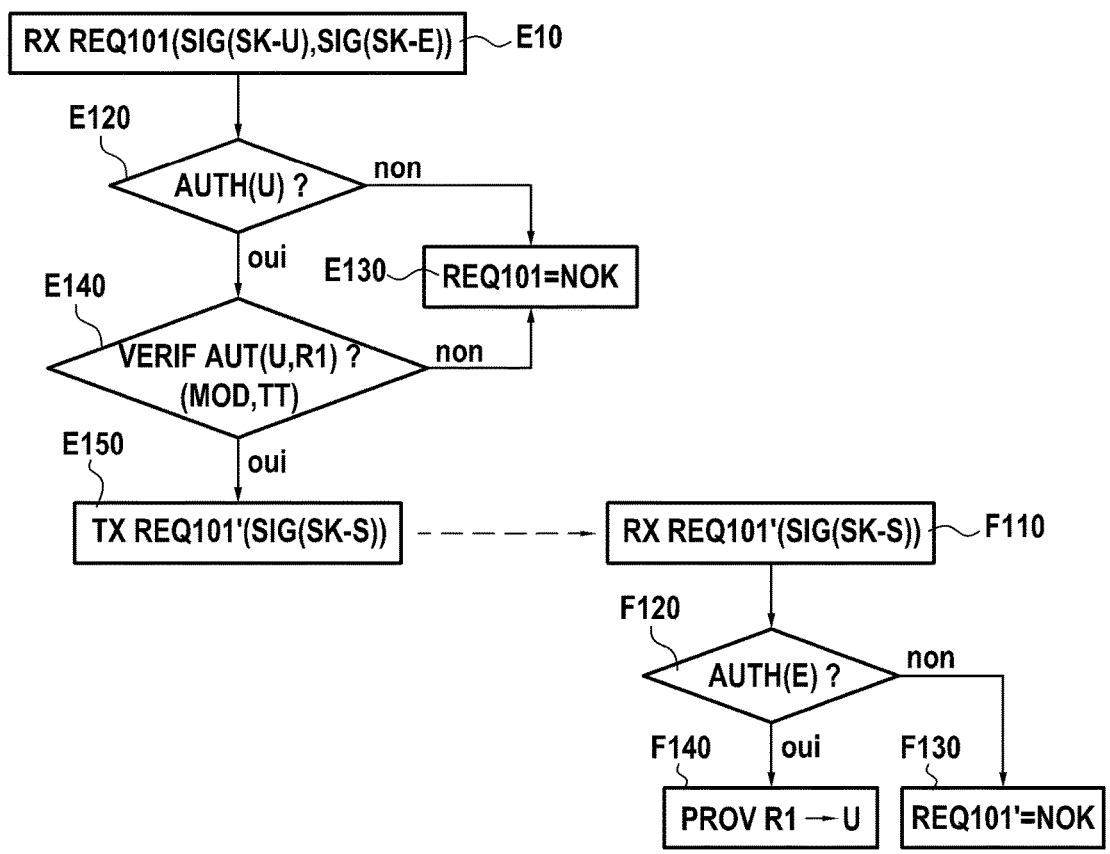

ACCESSING A COMPUTER RESOURCE USING AN ACCESS CONTROL MODEL AND POLICY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 in their entireties.

BACKGROUND OF THE INVENTION

The present disclosure relates to the general field of telecommunications, and in particular to so-called "cloud" computer systems.

Some embodiments relate more particularly to a user of an entity such as a business accessing computer resources made available to that entity by a cloud computer system.

According to a definition given by the National Institute of Standards and Technology (NIST), cloud computing is a model that enables users to act via a network to obtain self-service access on request to computer resources such as storage space, calculation power, applications, network resources, software, or indeed services, which are virtualized (i.e. made virtual) and shared.

In other words, the computer resources are no longer located on a server that is local to an entity or on a user's terminal, but, in accordance with the cloud computing concept, they are "dematerialized" in a cloud made up of a plurality of remote servers that are mutually interconnected and accessible to users, e.g. via a network application. Users can thus access these resources in varying manner without any need to manage the underlying management infrastructure of these resources, which infrastructure is often complex.

The concept of "cloud computing" is described in detail in the document published by the International Telecommunication Union (ITU) under the title "FG Cloud TR, version 1.0—part 1: introduction to the cloud ecosystem: definitions, taxonomies, use cases and high level requirements", February 2012.

In known manner, cloud computing benefits from numerous advantages:
flexibility and diversity of resources, which are shared and practically unlimited;
potential changes to the resources, which are supplied on demand;
simple and automatic administration of the computer infrastructures and of the networks of businesses, with corresponding reductions in administration costs; and etc.

Nevertheless, a major challenge with the concept of cloud computing is to guarantee that access to resources is protected and made secure.

Transferring from a conventional computer environment that is secure and closed to an infrastructure in the cloud that is open and shared, over which the user or the business has no control and which is accessible via a telecommunications network such as the public Internet, which is particularly vulnerable and perpetually subject to computer attacks and piracy, leaves potential users with certain worries concerning security.

The ITU thus finds nowadays that access control comprises fundamental means for securing access to cloud computer systems.

Present public solutions for cloud computer systems, such as Amazon Web Services or Windows Azure, make use of identity management and access control mechanisms that are relatively simple and that rely essentially on the following three processes:
managing digital identities and authentication data with the cloud computer system;
authenticating users; and
authorizing users to access resources made available by the cloud computer system.

In general, those solutions make it possible for each client entity to create a client account, and then within each client account to define users and to give those users or groups of users rights in terms of access to the resources made available to the entity by the cloud computer system. Users have their own authentication data with the cloud computer system (typically a user identifier and a private encryption key associated with a public encryption key held by the cloud computer system) and can use this data to access the resources made available by the cloud computer system. The control, properly speaking, of access to the resources relies on an access control model that is predefined for all of the client accounts, such as for example the role-based access control (RBAC) model described in the document by R-S. Sandhu et al., "Role-based access control models", IEEE Computer 29(2), pp. 38-47, 1996.

Although such a mechanism for managing identities and controlling access enables access to the resources made available by the cloud computer system to be made secure and guarantees that resources for the various different client entities are kept separate, it nevertheless lacks flexibility. A single predefined access control model is adopted for all client accounts. Unfortunately, that single model may not be suitable for all client accounts.

OBJECT AND SUMMARY OF THE INVENTION

Some embodiments of the invention serve in particular to mitigate that drawback by proposing a processing method for processing an access request from a terminal of a user to a computer resource made available to a client entity by a platform of a cloud computer service supplier, the method being for performing by an authentication and authorization module of a server situated between the terminal and the platform, the authentication and authorization module being associated with the client entity, the processing method comprising, on the access request being received by the server:
authenticating the user with the help of at least a first authentication parameter for authenticating the user with the server;
verifying that the user is authorized to access the computer resource via the terminal by applying to the user and to the resource an access control model and an access control policy corresponding to the model, which model and policy are obtained by the authentication and authorization module for the client entity; and
if the user is authorized to access the computer resource, sending to the platform a request derived from the access request on the basis of at least one second authentication parameter for authenticating the client entity with the platform; or
else rejecting the access request.

Correspondingly, also provided is a server situated between a terminal of a user and a platform of a cloud computer service supplier for making computer resources available to at least one client entity, the server including at least one authentication and authorization module associated with a said client entity and comprising:

- an authentication unit for authenticating the user, which unit is activated on receiving a request from the terminal to access a said computer resource made available to the client entity, the authentication unit being suitable for using at least a first authentication parameter for authenticating the user with the server;
- a verification unit suitable for verifying that the user is authorized to access the computer resource via the terminal by applying to the user and to the resource an access control model and an access control policy corresponding to the model, which model and policy are obtained by the verification unit for the client entity;
- a sender unit that is activated if the user is authorized to access the computer resource suitable for sending to the platform a request that is derived from the access request on the basis of at least a second authentication parameter for authenticating the client entity with the platform; and
- a unit suitable for rejecting the access request if the user is not authorized to access the computer resource.

Some embodiments of the invention thus provide a secure mechanism for controlling access to computer resources made available to a client entity by a cloud computer system, which mechanism relies on a functional device that is distinct from the platform of the cloud computer system supplier, namely a server located upstream from the platform. The server seeks to control access by a user to an account of a client entity registered with the platform of a cloud computer service supplier and via which the platform makes computer resources available to the client entity.

More precisely, a user seeking to act via a terminal to access a computer resource reserved to the client entity is authenticated by an authentication and authorization module of the server that is dedicated to that purpose. This authentication relies on using authentication parameter(s) for authenticating the user with the server, which parameter(s) have previously been defined between the user (or more precisely the user's terminal) and the server, and/or exchanged between them, where appropriate.

As used herein, the term "authentication parameters" for authenticating any entity A with any other entity B is used to mean elements that enable authentication data for authenticating the entity A with the entity B to be managed and/or processed (manipulated), i.e. the data that is to be used by the entity A for proving its identity to the entity B so as to be authenticated by the entity B. Such authentication parameters can also designate a secret encryption key shared between (i.e. held by) the entity A and the entity B, or a public and private key pair held respectively by the entity B and the entity A that make it possible to generate and process authentication data, such as, by way of example, a digital signature, a certificate, or a security token enabling the entity B to be sure of the identity of the entity A.

The server also performs verification seeking to ensure that the authenticated user is indeed authorized to access the requested resource. For this purpose, it uses an access control model and an access control policy associated with the model that are obtained by the server for the client entity, in other words that are personalized and defined for that client entity specifically. For example, the access control model is derived from a metadata file describing the elements defining the model (e.g. role, action, subject, view) and a structure for these elements (e.g. expected format and/or attribute(s)).

The access control model and policy are consequently easily configured (in the example considered above, by supplying a distinct metadata file for each intended model), and they can be modified dynamically by the client entity so as to enable access to be controlled in a manner that is adapted to the needs of that client entity at a given instant and to the access policy it desires to implement for its resources and its users.

Thus, in a particular embodiment, the authentication and authorization module may further comprise an updating unit suitable for detecting a change of the model and/or the access control policy to a new model and/or a new access control policy, and for obtaining the new model and the new access control policy in order to use it during the verification process. As a result, while it is controlling access, the server applies an access control model and/or policy that is up to date and pertinent for the client entity. The mechanism and the server of some embodiments of the invention thus make it possible easily and in real time to take account of modifications or updates that the client entity determines for its access policy.

It should be observed that some embodiments of the invention make provision for an authentication and authorization module that is distinct for each client entity of the cloud computer service supplier, thus naturally making it possible to provide distinct management of identities and of access control on behalf of those various entities. Each authentication and authorization module may be a software module (e.g. an instance of a software application, also known as a "bundle") or it may be a physical module that is isolated from other authentication and authorization modules used by the server. This mechanism thus makes it easy in the server to apply different access control models (and policies) to different client entities, while protecting access to the resources for those entities. This provides great flexibility compared with the prior state of the art.

Furthermore, some embodiments of the invention provide great modularity: it is easy to add an authentication and authorization module in the server when a new client entity is served by the service supplier, and conversely it is also easy to delete such a module without impact on performing access control for other client entities. In similar manner, it is possible to define new users for a client entity and/or to delete such users in the server in a manner that is transparent for the platform of the service supplier.

After authenticating the user and verifying that the user is indeed authorized to access the requested resource, the server transfers the access request to the platform of the service supplier: this request is advantageously modified before being transferred by using authentication parameter(s) for authenticating the client entity with the platform so as to enable the platform of the service supplier to authenticate the client entity with which the user is associated. Some embodiments of the invention thus make it easy to interface the processing method and the server with the above-described exiting cloud computer service solutions, and that have their own authentication and authorization modules. The platform of the service supplier no longer needs to manage the accounts of users associated with a client entity account, nor does it need to manage the rights associated with those user accounts: it needs only to manage the accounts of the client entity. The authentication data and the user accounts are managed in centralized manner by the server.

In a particular implementation, the verification process further comprises obtaining information about the availability of the computer resource coming from the platform.

As a result, while controlling access, the authentication and verification module associated with the client entity can also take account of the current availability of the resource (i.e. at the time the request is received) at the platform, and as a function of this availability it can adapt a decision whether or not to authorize the terminal to access the resource.

In a particular implementation, the request derived from the access request from the terminal further includes information representative of the user authentication and verification processes being successful.

This information enables the platform of the service supplier to be sure that user authentication has been carried out properly upstream.

In a particular implementation,
said at least one first authentication parameter comprises at least a first encryption key comprising a secret key held by the terminal and by the server, or a private and public key pair held respectively by the terminal and the server;
the access request from the terminal includes first authentication data for authenticating the terminal with the server generated from at least a portion of the access request and/or from an identifier of the user with the help of a said first encryption key held by the terminal; and
the authentication process comprises decrypting the first authentication data with the help of a said first encryption key held by the server.

The decryption of the first authentication data serves to authenticate the user: this first authentication data can be decrypted only if the user generated it by using a key corresponding to the key held by the server and associated with the user (e.g. a private key associated with the public key or a secret key shared with the server).

Furthermore, in a first variant implementation:
said at least second authentication parameter comprises at least a second encryption key comprising a secret key held by the server and by the platform, or a private and public key pair held respectively by the server and by the platform; and
the request derived from the access request from the terminal includes second authentication data for authenticating the entity with the platform as generated from at least a portion of the access request and/or of an identifier of the client entity with the help of a said second encryption key held by the server.

This variant is particularly suitable when the server has knowledge of the authentication parameters and/or data of the client entity for authenticating it with the platform of the cloud computer service supplier. The server can then incorporate authentication data in the request derived from the access request received from the terminal, which authentication data enables the platform of the service supplier to be sure that the access request does indeed come from a terminal having the authentication parameters for the client entity (and thus a priori authorized by and/or recognized by the client entity), and where appropriate it can authenticate the terminal.

In a second variant implementation:
said at least one second authentication parameter for authenticating the entity comprises at least a second encryption key comprising a secret key held by the terminal and by the platform, or a private and public key pair held respectively by the terminal and by the platform;
the access request from the terminal further includes second authentication data for authenticating the entity as generated from at least a portion of the access request and/or from an identifier of said client entity with the help of a said second encryption key held by the terminal; and
the request derived from the access request from the terminal includes the second authentication data and third authentication data generated with the help of a third encryption key held by the server.

Correspondingly, in this second variant, for each authentication and authorization module of the server:
said at least one first authentication parameter comprises at least a first encryption key comprising a secret key held by the terminal and by the server or a private and public key pair held respectively by the terminal and by the server;
said at least one second authentication parameter for authenticating the client entity comprises at least one second encryption key comprising a secret key held by the terminal and by the platform or a private and public key pair held respectively by the terminal and by the platform;
the access request from the terminal includes first authentication data generated from at least a portion of the access request and/or an identifier of the user with the help of a said first encryption key held by the terminal, and second authentication data generated from at least a portion of the access request and/or an identifier of the client entity with the help of a second encryption key held by the terminal;
the authentication unit is suitable for decrypting the first authentication data with the help of a said first encryption key held by the server; and
the derived request includes the second authentication data and third authentication data generated with the help of a third encryption key held by the server.

The second authentication data may be incorporated (or included) in the third authentication data. For example, the third authentication data may be (an optionally condensed) encrypted version of the second authentication data that has been encrypted with the help of the third encryption key held by the server.

In an alternative, the third authentication data may be generated with the help of the third encryption key from said at least one portion of the access request and/or of the identifier used to generate the second signature.

This second variant has a preferred application when, in contrast, the server does not have knowledge of the authentication parameters and/or data for authenticating the client entity with the platform of the cloud computer service supplier, for example in order to ensure confidentiality and security for the parameters of the client account of the client entity with the cloud computer service supplier. By means of the second and third encryption keys, the server can continue to authenticate the user of the terminal reliably without accessing the authentication parameters for authenticating the client entity with the platform of the service supplier, while also ensuring that the request that is transferred to the platform of the service supplier does indeed contain the authentication data of the client entity in order to secure access to the resources made available to the client entity by the platform. When the server belongs to a third party (i.e. a party distinct from the client entity and from the supplier of cloud computer service), this serves to avoid any attack on the server obtaining the authentication parameters and/or data of the account of the client entity with the supplier of the cloud computer service supplier.

In a particular implementation of some embodiments of the invention, the (first, second, and/or third) authentication data comprises or is digital signatures.

Advantageously, this type of authentication data enables the server and/or the platform to verify the integrity of the requests reaching them.

The above-described second variant implementation relies not only on the server and the processing method it performs, but also on the platform of the cloud computer service supplier which is capable of processing the request as transferred by the server and which contains the second and third signatures.

Thus, in another aspect, some embodiments of the invention also provide a method of supplying access to a computer resource made available to a client entity by a platform of a cloud computer service supplier, the method being for performing by the platform and comprising:

receiving a request derived by a server from an access request from a terminal of a user made to the computer resource and resulting from executing the access request processing method according to the second above-described variant, the server being situated between the terminal and the platform;

authenticating the client entity with the help of said at least one second authentication parameter for authenticating the client entity with the platform and comprising:

decrypting the third signature with the help of an encryption key held by the platform and associated with the third encryption key held by the server; and decrypting the second authentication data with the help of a said second encryption key held by the platform; and supplying the computer resource to the terminal.

Correspondingly, also provided is a platform of a computer service supplier making computer resources available to at least one client entity, the platform comprising:

a validation module comprising:

a reception unit for receiving a request derived by a server according to the second above-described variant from an access request from a terminal of a user requesting access to a said computer resource made available to the client entity, the server being situated between the terminal and the platform; and a client entity authentication unit comprising:

a component configured to decrypt the third signature with the help of an encryption key held by the platform and associated with the third encryption key held by the server; and a component configured to decrypt the second authentication key with the help of a said second encryption key held by the platform; and a module for supplying the computer resource to the terminal.

The advantages from which this supply method benefits and the platform using this method are identical to those described above for the processing method and the server in the second variant.

In a particular implementation, the supply method further comprises a process of verifying that the client entity is authorized to access the computer resource requested by the terminal.

In a particular implementation, the various processes of the processing method and/or of the supply method are determined by computer program instructions.

Consequently, also provided is a computer program on a data medium, the program being suitable for being performed in a server or more generally in a computer, the program including instructions adapted to perform a processing method as described above.

Also provided is a computer program on a data medium, the program being suitable for being performed in a platform of a cloud computer service supplier or more generally in a computer, the program including instructions adapted to perform a supply method as described above.

These programs may use any programming language, and may be in the form of source codes, object codes, or code intermediate between source codes and object codes, such as in a partially compiled form, or in any other desirable form.

Also provided is a computer readable data medium that includes instructions of a computer program as mentioned above.

The data medium may be any entity or device capable of storing the program. For example, the medium may comprises storage means such as a read only memory (ROM), e.g. a compact disk (CD) ROM or a microelectronic circuit ROM, or indeed magnetic recording means, such as a floppy disk or a hard disk.

Furthermore, the data medium may be a transmissible medium such as an electrical or optical signal, suitable for being conveyed via an electrical or optical cable, by radio, or by other means. In some embodiments, the program may in particular be downloaded from an Internet type network.

Alternatively, the data medium may be an integrated circuit in which the program is incorporated, the circuit being adapted to execute or to be used in the execution of the method in question.

In another aspect, also provided is a system comprising:

a platform of a cloud computer service supplier making computer resources available to at least one client entity; and a server as described herein, situated between the platform of the service supplier and a terminal from which an access request originates requesting access to a said computer resource made available to the client entity by the platform of the service supplier.

In a particular embodiment, the server and the platform are in accordance with the second above-described variant.

In other implementations and embodiments, it is also possible to envisage that the processing method, the supply method, the server, the platform of the cloud computer service supplier, and the system presents some or all of the above-mentioned characteristics in combination.

BRIEF DESCRIPTION OF THE DRAWINGS

Other characteristics and advantages of some embodiments of the present invention appear from the following description made with reference to the drawings and the appendices and showing embodiments and implementations having no limiting character. In the figures and appendices:

FIGS. 6A and 6B are flow charts showing respectively the main processes of a processing method of one embodiment of the invention and the main processes of a supply method of one embodiment of the invention as performed respectively by the server and by the platform of FIG. 5 in the second embodiment; and Appendices 1 and 2 show examples of metadata file structures suitable for use in describing the access control models used by the servers of FIGS. 1 and 5.

DETAILED DESCRIPTION OF THE PREFERRED EMBODIMENT

Figure 1:
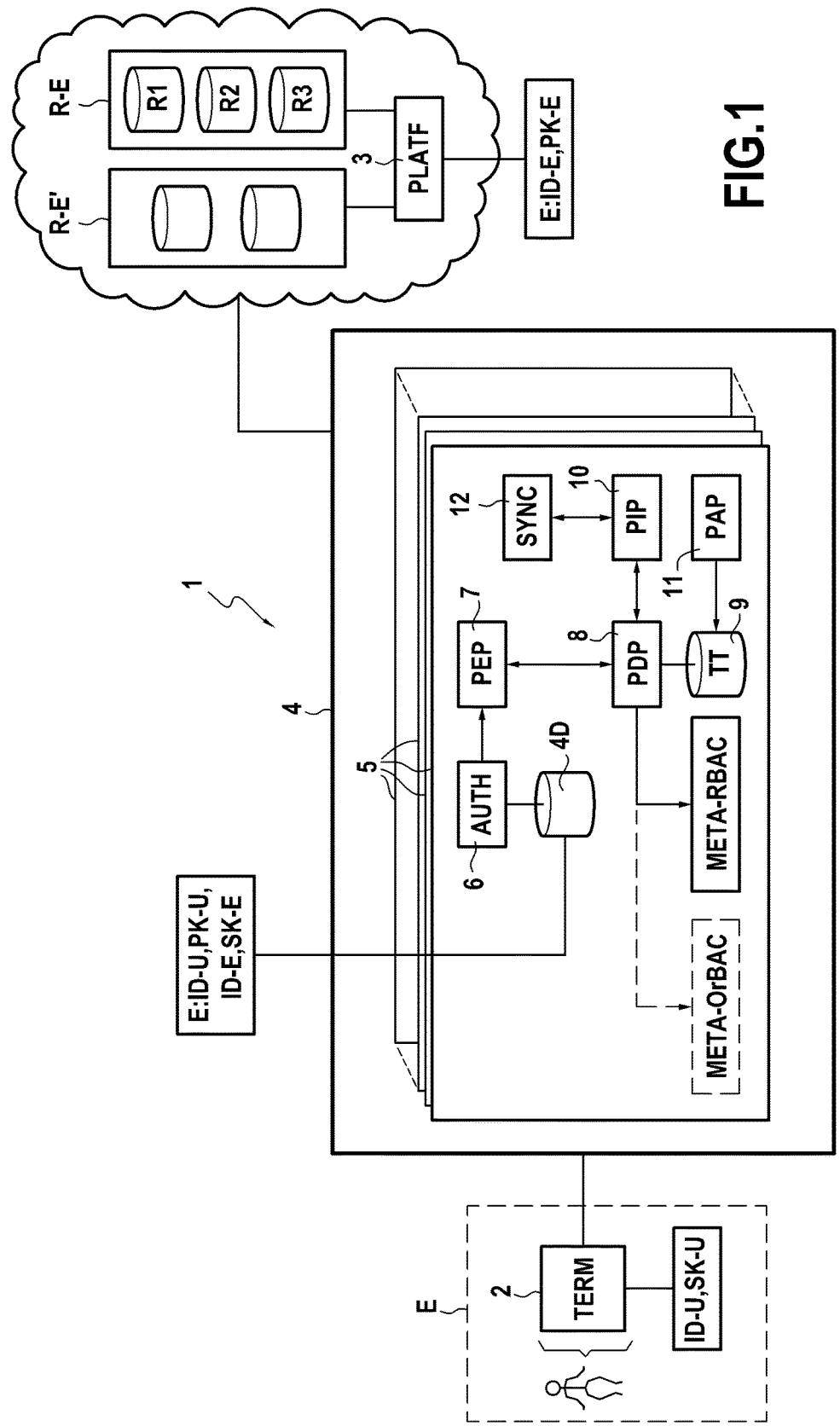
FIG. 1 is a diagram of a system and a server in accordance with one embodiment of the invention, together with a platform of a cloud computer service supplier in a first embodiment.

FIG. 1 shows a first embodiment of a system 1 in accordance with one embodiment of the invention in its environment, in which the system 1 serves to control access of a user U to a computer resource R1. The user U is attached to a "client" entity E via a terminal 2. The resource R1 is a resource selected from a set of computer resources R-E made available to the client entity E by a platform 3 of a cloud computer service supplier. The set of resources R-E may comprise, for example: storage space; calculation power; applications; network resources; software; or indeed services; that are virtual or shared.

By way of example, the client entity E is a business having a plurality of users attached thereto, including the user U. In known manner, the client entity E has a client account registered with the platform 3 in order to access the computer resources R-E. The client account is protected by one or more authentication parameters (second authentication parameters as described herein) enabling the platform 3 to identify the entity E.

As mentioned above, the term "authentication parameters" for enabling some entity A to authenticate itself with some other entity B means elements that enable authentication data for authenticating the entity A with the entity B to be generated and/or processed (manipulated), i.e. data that is to be used by the entity A in order to prove its identity to the entity B and thus be authenticated by the entity B.

In the presently-described example, these authentication parameters comprise a pair of encryption keys comprising a public key PK-E and a private key SK-E associated with an identifier of the entity E (such as for example a name or a client account number or indeed an email address, etc.) written ID-E. In this example, this pair of keys is defined by the platform 3 when registering the entity E. The private key SK-E is supplied by the platform 3 to the entity E and it is to be kept secret by that entity or at least to be disclosed in restrictive manner (e.g. to trusted entities or people) in order to avoid having its client account with the platform 3 stolen. The public key PK-E in this example is stored in memory by the platform 3 in association with the identifier ID-E in the client account of the entity E.

In a variant, the private and public key pair SK-E and PK-E is generated by a conventional trusted entity, the private key SK-E being supplied by that trusted entity to the entity E, while the public key PK-E is made available to the platform 3.

In the first embodiment described herein, the system 1 comprises the platform 3 together with a server 4 as described herein situated between the terminal 2 and the platform 3, and more precisely in series on the path followed by the request issued by the user U via the terminal 2 to access resources in the set of resources R-E made available to the entity E by the platform 3. The server 4 may be located equally well with the client entity E, with the cloud computer service supplier (in a functional or hardware entity that is distinct from the platform 3) or with a third party that is distinct both from the client entity E and the cloud computer service supplier.

As mentioned above, the server 4 controls access to the resources of the set of resources R-E by the users of the client entity E, and thus in particular by the user U. For this purpose, it maintains a plurality of accounts that are attached to these users associated with the client entity E, each user account having a user identifier and authentication parameters for authenticating that user with the server 4 (first authentication parameters as described herein). In the presently-described example, these authentication parameters comprise a private/public key pair defined by the server 4 when registering each user. The private key was supplied to the user by the server 4 in secure manner, e.g. via the user's terminal, and it is to be kept secret by the user. Thus, in the example shown in FIG. 1, the server 4 has an account registered for the user U of the client entity E, which account stores an identifier ID-U of the user U and a public key PK-U associated with a private key SK-U held by the user U on the terminal 2.

Furthermore, in the first embodiment described herein, the server 4 also stores in memory the identifier ID-E of the entity E and the private key SK-E allocated to the entity E by the platform 3. In this example, these parameters were supplied thereto by the entity E, e.g. when taking out its subscription to the access control service made available by the server 4.

Figure 2:
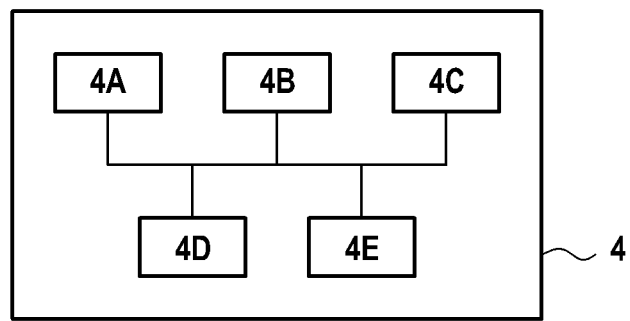
FIGS. 2 and 3 show examples of hardware architecture respectively for the server and for the platform of FIG. 1.

In this example, the server 4 has the hardware architecture of a computer, as shown in FIG. 2. In particular, it comprises a processor 4A, a ROM 4B, a random access memory (RAM) 4C, a non-volatile memory 4D that stores in particular the user account attached to the client entity E (and thus the account of the user U including the identifier ID-U and the public key PK-U), together with the identifier ID-E and the private key SK-E of the entity E, and also communications means 4E in particular for communicating with the platform 3 and the terminal 2. By way of example, these communications means 4E incorporate a network card of conventional type not described herein or any other means for communicating over a telecommunications network.

The ROM 4B of the server constitutes a data medium in accordance with some embodiments of the invention that is readable by the processor 4A and that stores a computer program in accordance with some embodiments of the invention including instructions for executing a processing method in accordance with one embodiment of the invention as described below with reference to FIG. 4A in the first embodiment.

In equivalent manner, this computer program defines functional modules of the server 4, and more precisely, with reference to FIG. 1, an authentication and validation module 5 associated with the client entity E and comprising in this example:

an authentication unit 6;
a processor unit 7 for processing access requests coming from user terminals and serving firstly to apply the policy defined by E for access to its resources (i.e. an access control model and policy), and secondly to transfer access requests that are "valid" (i.e. authenticated and authorized) to the platform 3;

a verification unit 8 suitable for making a decision concerning access on the basis of an access request by applying the current access control model and policy as defined by the entity E;

a repository 9 containing the access control policy(ies) defined by the entity E (e.g. "a developer is authorized to manage such and such a program between 8:00 AM and 4:00 PM", "a manager is authorized to administer such and such a memory space via an IP address that is distinct from IP addresses associated with the office", etc.);

an information manager unit 10 associated with the access policy(ies) defined by the client entity E;

an administration unit 11 responsible for administering the access policies of the client embodiment E; and a synchronization unit 12 suitable for communicating with the platform 3, e.g. via an application programming interface (API) in order to obtain information concerning the current availability of the resources made available to the client entity E by the platform 3.

The functions proper of these various units are set out more clearly below when describing the processing method of one embodiment of the invention with reference to FIGS. 4A and 6A. Nevertheless, it can be observed that the units 7, 8, 10, 11, and 9 have roles that are respectively similar to the roles of policy enforcement point (PEP), policy decision point (PDP), policy information point (PIP), and policy administration point (PAP) blocks and to the access policy repository as defined in the extensible access control markup language (XACML) reference architecture as defined by the IETF standard for implementing access control in computer systems.

Furthermore, it should be observed that when the platform 3 provides a cloud computer service to a plurality of distinct client entities (e.g. it makes the set of resources R-E available to the client entity E, and it makes another set of resources R-E' different from the set of resources R-E available to another client entity E'), the server 4 may incorporate a plurality of authentication and validation modules of structure and operation that are identical to the structure and operation of the authentication and authorization module 5, with each of them being dedicated to a distinct client entity (in the above example, one authentication and authorization module dedicated to the client entity E for controlling access to the resources of the set of resources R-E and another authentication and authorization module dedicated to the client entity E' and serving to control access to the resources of the set of resources R-E'). These modules are preferably functionally or physically isolated from one another in order to ensure that access control management for the various entities is well separated. For example, these modules may be distinct software modules (also referred to as "instances") that are isolated from one another on distinct virtual machines, or they may be distinct hardware modules hosted by different physical servers. For simplification purposes, this description is limited to a single client entity, namely the client entity E.

Figure 3:
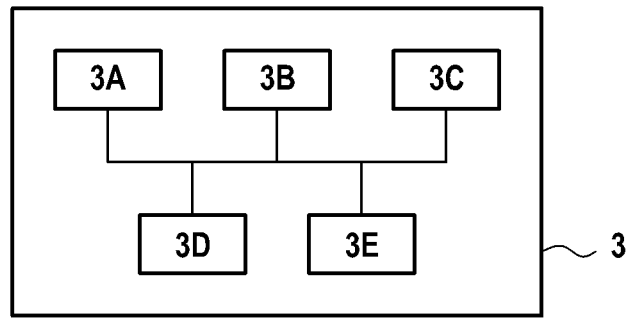

In the first embodiment described herein, the platform 3 of the cloud computer service supplier also has the hardware architecture of a computer, as shown in FIG. 3. Thus, it comprises a processor 3A, a ROM 3B, a RAM 3C, a non-volatile memory 3D (storing the account of the client entity E and in particular the identifier ID-E and the public encryption key PK-E), together with communications means 3E in particular for communicating with the server 4. By way of example, these communications means 3E may comprise a network card of conventional type not described in detail herein, or any other means for communicating over a telecommunications network.

The ROM 3B of the platform constitutes a data medium readable by the processor 3A and storing a computer program including instructions for executing a method of supplying access to a resource made available to the entity E and described below with reference to FIG. 4B in the first embodiment.

Figures 4A, 4B:
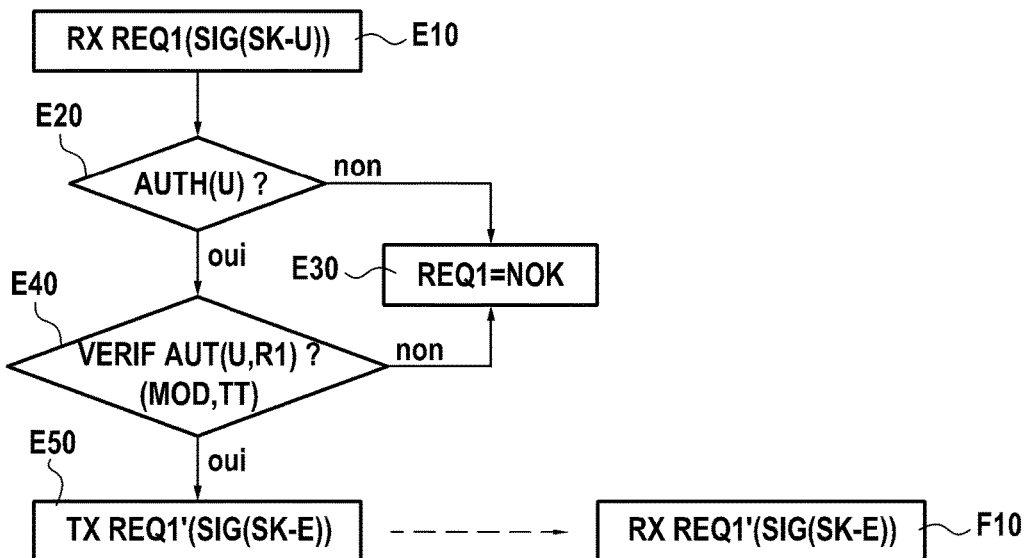
FIGS. 4A and 4B are flow charts showing respectively the main processes of a processing method of one embodiment of the invention and the main processes of a supply method of some embodiments of the invention as performed respectively by the server and by the platform of FIG. 1 in the first embodiment.

With reference to FIGS. 4A and 4B respectively, there follows a description of the main processes of a processing method of one embodiment of the invention for processing an access request issued by the terminal 2 of the user to the computer resource R1 made available to the entity E by the platform 3, and of one embodiment of a supply method for supplying the terminal 2 with access to the resource R1, as performed respectively by the server 4 and by the platform 3 in the first embodiment.

With reference to FIG. 4A, it is assumed that the user U of the entity E uses the terminal 2 to send an access request REQ1 to the server 4 (and more precisely to the authentication and authorization module 5 associated with the entity E) which request REQ1 is for access to the resource R1 made available to the entity E by the platform 3. This access request REQ1 comprises the identifier ID-U of the user U, a request body in which, in particular, the resource R1 is identified, and, in the first embodiment, first authentication data for authenticating the user U with the server 4 and generated with the help of the private encryption key SK-U of the user U.

More precisely, this first authentication data in this example is a digital signature SIG(SK-U) generated by applying a conventional hashing function HASH (e.g. the function MD5 or SHA) to the request body (or to a determined portion thereof) and to the identifier ID-U. The condensed digital fingerprint that results from this operation is then encrypted with an asymmetric encryption algorithm using the private encryption key SK-U in order to produce the digital signature SIG(SK-U). There is no limit associated with the encryption algorithm used.

The access request REQ1 is received by the server 4 via its communications means 4E and transmitted to the authentication unit 6 of the authentication and authorization module 5 of the server 4 associated with the entity E (E10).

The authentication unit 6 proceeds to authenticate the user U with the help of the authentication parameters of the user U stored in the non-volatile memory 4D (E20).

For this purpose, it uses the public encryption PK-U in order to decrypt the digital signature SIG(SK-U) contained in the access request REQ1 (using a decryption algorithm corresponding to the encryption algorithm used by the terminal 2 for generating the signature SIG(SK-U)). Such decryption is possible only if the public key PK-U does indeed correspond to the private key used by the terminal 2 in order to generate the signature included in the request. If this decryption takes place successfully, it serves to authenticate the user U.

In this example, the authentication unit 6 also evaluates a digital fingerprint by applying the hashing function HASH to the body of the request REQ1 and to the identifier ID-U. It compares this digital fingerprint with the result of the decryption. If these two elements are identical, that serves to guarantee the integrity of the access request REQ1 received by the server 4.

If authentication of the user U and/or verification of the integrity of the request should fail, then the access request REQ1 is rejected by the authentication unit 6 and the terminal 2 is informed (E30).

Otherwise, the access request is transferred by the authentication unit 6 to the processor unit 7 of the authentication and authorization module 5 of the server 4 in order to verify that the user U is authorized to access the resource R1.

On receiving the request REQ1, the processor unit 7 interrogates the verification unit 8 of the authentication and authorization module 5 to verify the access rights of the user U (E40).

The verification unit 8 identifies the access control model MOD and the access control policy Π (e.g. such and such a subject does or does not have permission to perform such and such an action on such and such an object) defined by the entity E for its policy for accessing its resources. In the presently-described embodiment, the access control model MOD is derived (i.e. obtained) from a metadata file describing the various elements defining the model and their structure. This metadata file is previously supplied to the server 4 by the entity E via the administration unit 11, or else it is constructed by the administration unit 11 on the basis of information supplied by the entity E. In this example it is stored in the non-volatile memory 4D of the server 4.

An example of a metadata file describing an access control model in the extensible markup language (XML) is given in Annex 1. This file comprises three portions. A first portion (1) specifies the name of the model. A second portion (2) specifies the elements of the model (i.e. the various entities defined in the model), and their respective attributes, where applicable. A third portion (3) specifies the formats of the access control policies corresponding to the model.

Annex 2 shows an example of such a metadata file META-RBAC issued for the access control model known as RBAC. Thus, in the second portion of the file, there are defined the elements "subject", "action", and "object" that correspond to the three entities envisaged in the access control model RBAC. The "subject" element is associated with the "role" attribute, each subject being associated with a role in the model RBAC (e.g. a possible role for a subject (i.e. a user or a service) within a business might be "admin", "manager", "employee", etc.). Finally, the third portion (3) specifies the form to be taken by the processing rules defined by the access control policies applied in the context of this model. Specifically, in this example, for a subject, an action, an object (e.g. resource R1) and a role associated with the subject, these rules should specify the access rights that are allocated ("permission").

It is assumed herein that the access control model MOD applied by the verification unit 8 is an access control model RBAC derived from the metadata file META-RBAC shown diagrammatically in Annex 2.

It should be observed that the metadata file describing the access control model MOD that is to be applied by the verification unit 8 may need to change over time, in particular if the entity E decides to make changes in its access policy. Thus, by way of example: the entity E may decide to replace the model RBAC described in the file META-RBAC by a model OrBAC such as that described in the document by A. Abou El Kalam et al. entitled "Organization based access control" 4$^{th}$ IEEE International Workshop on Policies for Distributed Systems and Networks, 2003. For this purpose, a new metadata file named META-OrBAC in FIG. 1 and drawn in dashed lines is supplied to the server 4. In the presently-described embodiment, the authentication and authorization module 5 has means for detecting such a change of access control model (by detecting the presence of the new metadata file META-OrBAC), and for informing the verification unit 8 about the change of model. The verification unit 8 then recovers (i.e. obtains) the file META-OrBAC describing the new model that is to be taken into account, and applies this new model during subsequent verifications. Some embodiments of the invention thus make it possible not only to define a personalized model for each entity E, but also to change the access control model dynamically and easily over time.

The access control policy Π is obtained by the verification unit 8 by consulting the repository 9 of access control policies: it extracts from this repository the access control policy associated with the model defined in the metadata file META-RBAC. It is assumed that this repository has previously been provisioned by the entity E via the administration unit 11.

In the first embodiment described herein, the verification unit 8 also consults the management unit 10 in order to obtain information about the resource requested by the terminal 2, i.e. the resource R1. The management unit 10 interrogates the synchronization unit 12 with the platform 3 of the authentication and authorization module 5 in order to discover the current availability of the resource R1, and it communicates this information by return to the management unit 10 which forwards it to the verification unit 8.

The verification unit 8 then applies the access control model MOD and the access policy Π as obtained in this way to the request REQ1 from the user U (in other words to the user U and to the requested resource R1) while taking account of the information concerning the availability of the resource R1 as communicated by the synchronization unit 12, and determines whether the user U is authorized to access the resource R1 (E40). It informs the processor unit 7 of the result of this determination.

If the verification unit 8 determines that the user U is not authorized to access the resource R1, then the access request REQ1 is rejected by the processor unit 7 of the authentication and authorization module 5 of the server 4, and the user U is informed via the terminal 2 (E30). The access request REQ1 is not transferred to the platform 3 and the user U does not have access to the resource R1 via the terminal 2.

Otherwise, if the verification unit 8 determines that the user U is authorized to access the resource R1 via the terminal 2, then the processor unit 7 sends an access request REQ1' derived from the access request REQ1 to the platform 3 of the cloud computer service supplier via the communications means 4E of the server 4 (E50).

More specifically, the processor unit 7 constructs the request REQ1' from the request REQ1, in which the identifier ID-U of the user U is replaced by the identifier ID-E of the entity E (where the user U is not necessarily known to the platform 3), and the signature SIG(SK-U) is replaced by second authentication data for authenticating the entity E with the platform 3 as generated using the encryption key SK-E held by the server 4.

In the first embodiment described herein, this second authentication data is a digital signature SIG(SK-E) generated by applying a hash function HASH' (which hash function HASH' may be identical to or distinct from the function HASH) to the body of the request REQ1 (or to a determined portion of this request body) and to the identifier ID-E. The condensed result of this operation is then encrypted using an asymmetric encryption algorithm with the private encryption key SK-E in order to provide the digital signature SIG(SK-E). No limit is associated with the encryption algorithm used.

The request REQ1' derived from the request REQ1 thus contains the body of the request REQ1, the identifier ID-E, and the signature SIG(SK-E).

Thus, by using the authentication parameters of the entity E with the platform 3 in order to generate the request REQ1', the server 4 hides the information specific to the user U from the platform 3. The platform 3 thus has no need to manage user accounts for the entity E.

In a variant embodiment, the server 4 also includes in the request REQ1' information representative of the success of the processes for authenticating the user and for verifying the authorization of the user U to access the resource R1. This information may optionally be encrypted with the help of the private encryption key SK-E.

With reference to FIG. 4B, on receiving the request REQ1' (F10), the platform 3 uses its validation module to authenticate the entity E with the help of authentication parameters of the entity E stored in its non-volatile memory 3D (F20).

For this purpose, it uses the public encryption key PK-E for decrypting the digital signature SIG(SK-E) contained in the access request REQ1' (and a decryption algorithm corresponding to the encryption algorithm used by the server 4 for generating SIG(SK-E)). Such decryption is possible only if the public key PK-E does indeed correspond to the private key used by the server 4 for generating the signature included in the request. If this decryption is successful, it serves to authenticate the entity E.

In this example, the validation module of the platform 3 also evaluates a digital fingerprint by applying the hashing function HASH' to the body of the request REQ1 included in the request REQ1' and to the identifier ID-E. It compares the digital fingerprint with the result of the decryption of the signature SIG(SK-E). These two elements being identical serves to guarantee the integrity of the access request REQ1' received by the platform 3.

In known manner, the platform 3 may also verify that the requested resource R1 is indeed a resource for use by the entity E.

If the authentication of the entity E and/or the verification of the integrity of the request should fail, the access request REQ1' is rejected by the validation module of the platform 3 and the server 4 is informed (F30). The server 4 in turn informs the user U of this failure via the terminal 2.

Otherwise, the platform 3 informs the server 4 that the entity E has been authenticated successfully and it provides the terminal 2 with the requested access to the resource R1 (F40).

In this first embodiment, the server 4 holds authentication parameters for authenticating the entity E with the platform 3. As mentioned above, the server 4, which acts as an intermediary between the terminal 2 and the platform 3, may be located equally well with the entity E (or the user U), with the cloud computer service supplier, or with a third party entity distinct from the entity E and from the cloud computer service supplier. In this third-party configuration, the entity E might be reticent about disclosing to the server 4 its own parameters and/or authentication data for authenticating the entity E with the platform 3. In a second embodiment described below, the invention advantageously enables such a constraint to be handled.

Figure 5:
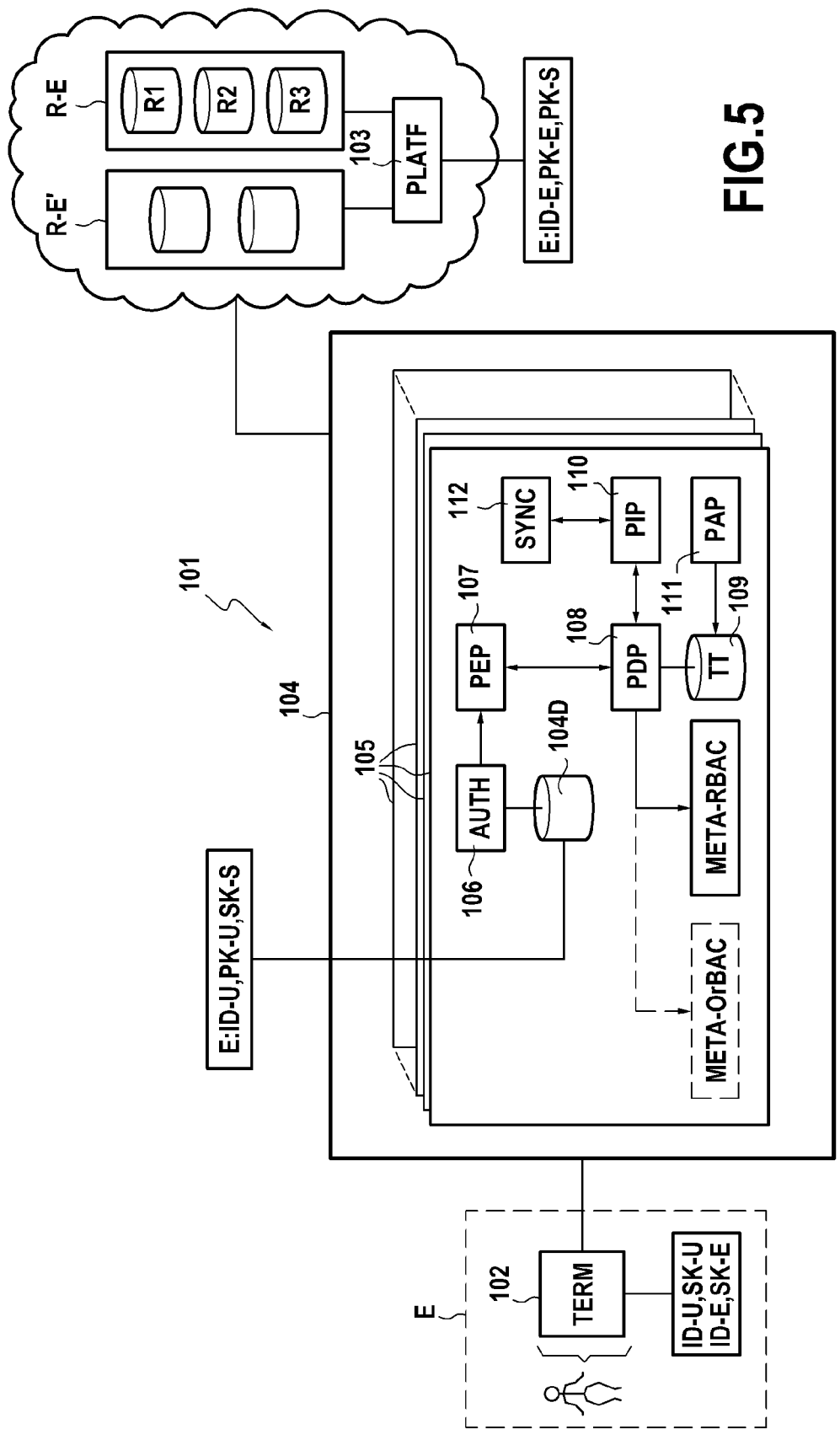
FIG. 5 is a diagram of a system, a server, and a platform of a cloud computer service supplier in accordance with a second embodiment of the invention.

FIG. 5 shows a system 101 in accordance with one embodiment of the invention in this second embodiment. Elements of the system 101 that are similar or functionally identical to elements of the system 1 are designated by the same references plus 100 (e.g. terminal 2→terminal 102, platform 3→platform 103, etc.) and they are not described again in detail.

The system 101 differs from the system 1 shown in FIG. 1 mainly as follows:
the authentication parameters for authenticating the entity E with the platform 103 of the cloud computer service supplier (or more precisely the private encryption key SK-E in the above example) are no longer contained in the server 104, but only in the terminal 102 of the user U; and
an additional public/private pair of keys written PK-S and SK-S respectively is defined by the platform 3 (or by a trusted entity) for the entity E, the private key SK-S being supplied to the server 4 where it is to be kept secret, while the public key PK-S is stored in the account of the entity E by the platform 3 together with the identifier ID-E and the public key PK-E.

In other words, three pairs of public/private encryption keys are now used in this second embodiment:
the encryption key pair PK-U/SK-U for authenticating the user U with the server 104; and
the two encryption key pairs PK-E/SK-E and PK-S/SK-S that serve to authenticate the entity E with the platform 103 while keeping private from the server 104 the authentication parameters of the entity E: only the identifier ID-E of the entity is known to the server 104, and the private key SK-E is not disclosed to it.

As a result, if the integrity of the server 104 is compromised, e.g. as a result of an attack by a dishonest entity, the authentication parameters of the entity E for managing authentication data of the entity E with the platform 3 are not disclosed.

FIGS. 6A and 6B show the main processes of the processing method and of the supply method as performed respectively by the server 104 and by the platform 103 in the second embodiment.

With reference to FIG. 6A, in order to illustrate this second embodiment, it is assumed that the user U of the entity E uses the terminal 102 to send an access request REQ101 to the server 104 (and more precisely to the authentication and authorization module 105 associated with the entity E), where the request REQ101 is for access to the resource R1 made available to the entity E by the platform 103. This access request REQ101 includes the identifier ID-U of the user U and a request body which identifies in particular the resource R1.

In accordance with the second embodiment, the access request REQ101 also includes two items of authentication data, specifically:
a signature SIG(SK-U) of the body of the request and the identifier ID-U as generated by the terminal 102 by applying a hash function HASH to the body of the request REQ1 (or to a determined portion thereof) and to the identifier ID-U of the user U, and then by encrypting the obtained condensed hash by using the private encryption key SK-U with the help of a first asymmetric encryption algorithm; and
a signature SIG(SK-E) of the body of the request and of the identifier ID-E as generated by the terminal 102 applying a hash function HASH' (which may be identical to or distinct from the function HASH) to the body of the request REQ1 (or to a determined portion thereof) and to the identifier ID-E of the entity E, and then encrypting the obtained condensed hash with the private encryption key SK-E and with the help of a second asymmetric encryption algorithm.

No limit is associated with the asymmetric encryption algorithms selected for generating the signatures; they may be identical or distinct.

The access request REQ101 is received by the server 104 via its communications means 104E and is transmitted to the authentication unit 106 of the authentication and authorization module 105 of the server 104 associated with the entity E (E110).

The authentication unit 106 proceeds to authenticate the user U with the help of authentication parameters of the user U stored in the non-volatile memory 104D (first authentication data as described herein) (E120).

For this purpose, it uses the public encryption key PK-U to decrypt the digital signature SIG(SK-U) contained in the access request REQ101. Such decryption is possible only if the public key PK-U does indeed correspond to the private key used by the terminal 102 for generating the signature included in the request. If this decryption is successful it serves to authenticate the user U.

The authentication unit 106 in this example also evaluates a digital fingerprint by applying the hashing function HASH to the body of the request REQ101 and to the identifier ID-U. It compares this digital fingerprint with the result of the decryption. These two elements being identical serves to guarantee the integrity of the access request REQ101 as received by the server 104.

If the authentication of the user U and/or the verification of the integrity of the request should fail, the access request REQ101 is rejected by the authentication unit 106 and the terminal 102 is informed (E130).

Otherwise, the access request is transferred by the authentication unit 106 to the processor unit 107 of the authentication and authorization module 105 of the server 104 in order to verify that the user U is authorized to access the resource R1 (E140). This verification is carried out in the second embodiment by the processor, verification, manager, administration, and synchronization units 107, 108, 110, 111, and 112 in a manner identical to the verification carried out by the processor, verification, manager, administration, and synchronization units 7, 8, 10, 11, and 12 of the first embodiment.

If the verification unit 108 determines that the user U is not authorized to access the resource R1, the access request REQ101 is rejected by the processor unit 107 of the authentication and authorization module 105 of the server 104, and the user U is informed via the terminal 102 (E130). The access request REQ101 is not transferred to the platform 103 and the user U does not have access to the resource R1 via the terminal 102.

Otherwise, if the verification unit 108 determines that the user U is authorized to access the resource R1 via the terminal 102, the processor unit 107 sends an access request REQ101' derived from the access request REQ101 to the platform 103 of the cloud computer service supplier via the communications means 104E of the server 104 (E150).

More specifically, in the second embodiment described herein, the processor unit 107 constructs the request REQ101' from the request REQ101 in which it replaces the identifier ID-U of the user U via the identifier ID-E of the entity E (the user U not necessarily being known to the platform 103), and it replaces the signatures SIG(SK-U) and SIG(SK-E) by third authentication data SIG(S-S) in which the digital signature SIG(SK-E) is included. This third authentication data SIG(SK-S) in this example is generated by encrypting the digital signature SIG(SK-E) with the help of the private encryption key SK-S and of a third asymmetric encryption algorithm (distinct from or identical to that used by the terminal 102 for generating the signatures SIG(SK-U) and SIG(SK-E)).

The request REQ101' thus contains the body of the request 101 and the signature SIG(SK-S) generated from the signature SIG(SK-E). It thus does indeed include both signatures SIG(SK-S) and SIG(SK-E) as described herein.

In a variant embodiment, the server 104 also includes information in the request REQ101' that is representative of the success of the processes of authenticating the user and of verifying that the user U is authorized to access the resource R1. This information may optionally be encrypted using the private encryption key SK-S.

With reference to FIG. 6B, on receiving the request REQ101' (F110), the platform 103 uses its validation module to authenticate the entity E with the help of authentication parameters of the entity E stored in the non-volatile memory 103D (F120).

For this purpose, it proceeds in two stages:
in a first stage, it uses the public encryption key PK-S for decrypting the digital signature SIG(SK-S) contained in the access request REQ101'. This decryption is possible only if the public key PK-S does indeed correspond to the private key used by the server 104 for generating the signature included in the request, and it thus enables the platform 103 to authenticate the server 104; and
in a second stage, the platform 103 then uses the public encryption key PK-E to decrypt the result of decrypting the digital signature SIG(SK-S) (in other words the digital signature SIG(SK-E)). Such decryption is possible only if the public key PK-E does indeed correspond to the private key used by the terminal 102 for generating the signature SIG(SK-E).

If both of these two decryption operations are successful, that enables the platform 103 to authenticate the entity E.

The validation module of the platform 103 in this example also evaluates a digital fingerprint by applying the hashing function HASH' to the body of the request REQ101' and to the identifier ID-E. It compares the digital fingerprint with the result of the encryption. These two elements being identical serves to guarantee the integrity of the access request REQ101' as received by the platform 103.

In known manner, the platform 103 can also verify that the requested resource R1 is indeed a resource for use by the entity E.

If the authentication of the entity E and/or the verification of the integrity of the request should fail, then the access request REQ101' is rejected by the validation module of the platform 103, and the server 104 is informed (F130). The server 104 in turn informs the user U of this failure via the terminal 102.

Otherwise, the platform 103 informs the server 104 that the entity E has been authenticated successfully and supplies the terminal 102 with the requested access to the resource R1 (F140).

This second embodiment thus enables the server 104 to control access to the resources made available to the entity E by the platform 103 of the cloud computer service supplier without knowing the authentication parameters enabling the entity E to be authenticated with the platform. This serves to limit damage for the entity E in the event of an attack on the integrity of the server 104. By holding only the private key SK-S of the server 104, a dishonest entity cannot access the resources made available to the entity E by the platform 103.

In the second embodiment described herein, the request REQ101' transmitted to the platform 103 contains third authentication data SIG(SK-S) generated by encrypting the signature SIG(SK-E), such that the signature SIG(SK-E) is incorporated in the authentication data SIG(SK-S) while it is being transmitted in the request REQ101'.

In a variant of this second embodiment, the third authentication data SIG(SK-S) may be a digital signature of the signature SIG(SK-E) generated with the help of the private encryption key SK-S of the server 104 of a hashing function HASH", and of an asymmetric encryption algorithm. The request REQ101' derived from the access request REQ101 may then include both signatures SIG(SK-S) and SIG(SK-E) in order to enable the platform 103 not only to authenticate the entity E but also to verify the integrity of the request REQ101' after decrypting the signature SIG(SK-S).

In yet another variant of this second embodiment, the third authentication data SIG(K-S) may be a digital signature generated from the identifier ID-E and from the body of the request REQ101 used by the terminal 102 for generating the signature SIG(SK-E) (or from the same portion of the body of the request as that used by the terminal 102). The request REQ101' derived from the access request REQ101 may then include both of the signatures SIG(SK-S) and SIG(SK-E) to enable the platform 103 not only to authenticate the entity E but also to verify the integrity of the request REQ101' after decrypting the signatures SIG(SK-S) and SIG(SK-E) and comparing the results of these decryptions.

In other words, in both the first and the second embodiments, the authentication data used may equally well be the result of encrypting determined elements or of digital signatures of such elements, depending on whether or not it is desired to verify the integrity of requests conveying the authentication data.

It should be observed that using a protection mechanism such as that used in the second embodiment is not limited to an access control server such as the server 104 and to a platform of a cloud computer service supplier such as the platform 103. This mechanism may be applied to any type of entity A seeking to access directly or via an entity A' a service or a resource made available by an entity B via an entity C with which said entity A (or A') has an account and with which the entity A seeks to avoid disclosing its own authentication parameters and/or data for authentication with the entity B. Such an entity C acting as an intermediary between the entities A (or A') and B is also known as a "broker".

Furthermore, in both of the presently-described embodiments, consideration is given to asymmetric encryption schemes relying on a public encryption key and on a private encryption key. In another embodiment, it is possible to envisage using symmetric encryption schemes relying on a secret key that has previously been exchanged between the entities concerned (e.g. between the terminal and the server, between the terminal and the platform, and between the server and the platform). The authentication parameters then comprise such secret keys, which are used for generating and processing authentication data.

Annex 1
File structure example for metadata describing the model RBAC

```
<ModelName>ModelName</ModelName>                                    (1)
<EntityList>                                                         (2)
<Entity>
<EntityName>Name</EntityName>
<EntityAttribute>AttributeName</EntityAttribute>
```

-continued

Annex 1
File structure example for metadata describing the model RBAC

```
...
</Entity>
....
</EntityList>
<PolicyFormatList>                                                   (3)
<PolicyFormat>(Entity1,Entity1Attribute1,...,Entity1AttributeN,...,
EntityN,...Entity NAttributeN, CombineEquation,TypePermission)
</PolicyFormat>
...
</PolicyFormatList>
```

Annex 2
File structure example for metadata describing the model RBAC

```
<ModelName>RBAC</ModelName>
<EntityList>
<Entity>
<EntityName>Sujet</EntityName>
<EntityAttribute>Role</EntityAttribute>
</Entity>
<Entity>
<EntityName>Action</EntityName>
</Entity>
<Entity>
<EntityName>Objet</EntityName>
</Entity>
</Entities>
<PolicyFormatList>
<PolicyFormat>(Subjet,Role,Action,Object, Role equal= "",
permission)</PolicyFormat>
</PolicyFormatList>
```

The invention claimed is:

1. A processing method for processing an access request from a terminal of a user who is one of a plurality of users attached to a client entity which is one of a plurality of client entities, to a computer resource selected from a set of computer resources made available to the client entity by a platform of a cloud computer service supplier, the cloud computer service supplier providing to a plurality of distinct client entities corresponding distinct sets of resources, said method being performed by a server situated between the terminal and the platform, said processing method comprising, on the access request being received by the server:

authenticating said user who is one of a plurality of users attached to said client entity which is one of said plurality of client entities with the help of at least a first authentication parameter for authenticating the user with the server;

verifying that the user is authorized to access said computer resource selected from said set of computer resources via said terminal by applying to said user and to said resource an access control model and an access control policy corresponding to said model, which model and policy are supplied to said server by said client entity; and if the user is authorized to access the computer resource, sending to the platform a request derived from the access request on the basis of at least one second authentication parameter for authenticating the client entity with the platform wherein said server uses distinct authentication and authorization instructions for each client entity from among said plurality of client entities; or else rejecting the access request.

2. A processing method according to claim 1, wherein the verification process further comprises obtaining information about the availability of the computer resource coming from the platform.

3. A processing method according to claim 1, wherein:
said at least one first authentication parameter comprises at least a first encryption key comprising a secret key held by the terminal and by the server, or a private and public key pair held respectively by the terminal and the server;
the access request from the terminal includes first authentication data for authenticating the terminal with the server generated from at least a portion of the access request or from an identifier of the user with the help of a said first encryption key held by the terminal; and
the authentication process comprises decrypting the first authentication data with the help of a said first encryption key held by the server.

4. A processing method according to claim 3, wherein:
said at least one second authentication parameter for authenticating the entity comprises at least a second encryption key comprising a secret key held by the terminal and by the platform, or a private and public key pair held respectively by the terminal and by the platform;
the access request from the terminal further includes second authentication data for authenticating the entity as generated from at least a portion of the access request or from an identifier of said client entity with the help of a said second encryption key held by the terminal; and
the request derived from the access request from the terminal includes said second authentication data and third authentication data generated with the help of a third encryption key held by the server.

5. A processing method according to claim 4, wherein:
said second authentication data is incorporated in said third authentication data; or
said third authentication data is generated with the help of said third encryption key from said at least one portion of the access request or from the identifier used to generate said second authentication data.

6. A processing method according to claim 3, wherein said first authentication data comprises or is digital signatures.

7. A supply method for supplying access to a computer resource made available to a client entity by a platform of a cloud computer service supplier, wherein said computer resource is selected from a set of computer resources and wherein said client entity is one of a plurality of client entities, said method being performed by said service supplier platform and comprising:
receiving a request derived by a server from an access request from a terminal of a user who is one of a plurality of users attached to said client entity made to said computer resource and resulting from executing the access request processing method according to claim 5, said server being situated between the terminal and the platform;
authenticating the client entity with the help of at least one second authentication parameter for authenticating the client entity with the platform and comprising:
decrypting the third authentication data with the help of an encryption key held by the platform and associated with the third encryption key held by the server; and
decrypting the second authentication data with the help of a said second encryption key held by the platform; and
supplying the computer resource to the terminal, wherein said cloud computer service supplier provides to said plurality of distinct client entities corresponding distinct sets of resources.

8. A supply method according to claim 7, further comprising, before the process of supplying the computer resource to the terminal, verifying that the client entity is authorized to access said computer resource.

9. A processing method according to claim 1, wherein:
said at least one second authentication parameter comprises at least a second encryption key comprising a secret key held by the server and by the platform, or a private and public key pair held respectively by the server and by the platform; and
the request derived from the access request from the terminal includes second authentication data for authenticating the entity with the platform as generated from at least a portion of the access request or of an identifier of the client entity with the help of a said second encryption key held by the server.

10. A processing method according to claim 1, wherein the request derived from the access request from the terminal further includes information representative of the user authentication and verification processes being successful.

11. A computer having stored thereon instructions, which when executed by said computer, cause a service provider platform to perform a supply method for supplying access to a computer resource made available to a client entity by said service provider platform, wherein said computer resource is selected from a set of computer resources and wherein said client entity is one of a plurality of client entities, said supply method comprising:
receiving a request derived by a server from an access request from a terminal of a user who is one of a plurality of users attached to said client entity made to said computer resource and resulting from executing an access request processing method, said server being situated between the terminal and the platform;
authenticating the client entity with the help of at least one second authentication parameter for authenticating the client entity with the platform and comprising:
decrypting the third authentication data with the help of an encryption key held by the platform and associated with the third encryption key held by the server; and
decrypting the second authentication data with the help of a said second encryption key held by the platform; and
supplying the computer resource to the terminal, wherein said cloud computer service supplier provides to said plurality of distinct client entities corresponding distinct sets of resources;
wherein said access request processing method is a processing method for processing an access request from a terminal of a user who is one of a plurality of users attached to said client entity which is one of a plurality of client entities, to said computer resource selected from a set of computer resources made available to the client entity by said platform of a cloud computer service supplier, the cloud computer service supplier providing to a plurality of distinct client entities corresponding distinct sets of resources, said method being performed by said server situated between the terminal and the platform, said processing method comprising, on the access request being received by the server:
authenticating said user who is one of a plurality of users attached to said client entity which is one of said plurality of client entities with the help of at least a first authentication parameter for authenticating the user with the server;

verifying that the user is authorized to access said computer resource selected from said set of computer resources via said terminal by applying to said user and to said resource an access control model and an access control policy corresponding to said model, which model and policy are supplied to said server by said client entity; and if the user is authorized to access the computer resource, sending to the platform a request derived from the access request on the basis of at least one second authentication parameter for authenticating the client entity with the platform wherein said server uses distinct authentication and authorization instructions for each client entity from among said plurality of client entities; or else rejecting the access request;

wherein said at least one first authentication parameter comprises at least a first encryption key comprising a secret key held by the terminal and by the server, or a private and public key pair held respectively by the terminal and the server;

the access request from the terminal includes first authentication data for authenticating the terminal with the server generated from at least a portion of the access request or from an identifier of the user with the help of a said first encryption key held by the terminal; and the authentication process comprises decrypting the first authentication data with the help of a said first encryption key held by the server; and wherein said at least one second authentication parameter for authenticating the entity comprises at least a second encryption key comprising a secret key held by the terminal and by the platform, or a private and public key pair held respectively by the terminal and by the platform;

the access request from the terminal further includes second authentication data for authenticating the entity as generated from at least a portion of the access request or from an identifier of said client entity with the help of a said second encryption key held by the terminal; and the request derived from the access request from the terminal includes said second authentication data and third authentication data generated with the help of a third encryption key held by the server.

12. A non-transitory computer readable data medium having stored thereon a computer program including instructions which when executed by a computer, cause a service provider platform to perform a supply method for supplying access to a computer resource made available to a client entity by said service provider platform wherein said computer resource is selected from a set of computer resources and wherein said client entity is one of a plurality of client entities, said supply method comprising:

receiving a request derived by a server from an access request from a terminal of a user who is one of a plurality of users attached to said client entity made to said computer resource and resulting from executing an access request processing method, said server being situated between the terminal and the platform;

authenticating the client entity with the help of at least one second authentication parameter for authenticating the client entity with the platform and comprising:

decrypting the third authentication data with the help of an encryption key held by the platform and associated with the third encryption key held by the server; and decrypting the second authentication data with the help of a said second encryption key held by the platform; and supplying the computer resource to the terminal, wherein said cloud computer service supplier provides to said plurality of distinct client entities corresponding distinct sets of resources;

wherein said access request processing method is a processing method for processing an access request from a terminal of a user who is one of a plurality of users attached to said client entity which is one of a plurality of client entities, to said computer resource selected from a set of computer resources made available to the client entity by said platform of a cloud computer service supplier, the cloud computer service supplier providing to a plurality of distinct client entities corresponding distinct sets of resources, said method being performed by said server situated between the terminal and the platform, said processing method comprising, on the access request being received by the server:

authenticating said user who is one of a plurality of users attached to said client entity which is one of said plurality of client entities with the help of at least a first authentication parameter for authenticating the user with the server;

verifying that the user is authorized to access said computer resource selected from said set of computer resources via said terminal by applying to said user and to said resource an access control model and an access control policy corresponding to said model, which model and policy are supplied to said server by said client entity; and if the user is authorized to access the computer resource, sending to the platform a request derived from the access request on the basis of at least one second authentication parameter for authenticating the client entity with the platform wherein said server uses distinct authentication and authorization instructions for each client entity from among said plurality of client entities; or else rejecting the access request;

wherein said at least one first authentication parameter comprises at least a first encryption key comprising a secret key held by the terminal and by the server, or a private and public key pair held respectively by the terminal and the server;

the access request from the terminal includes first authentication data for authenticating the terminal with the server generated from at least a portion of the access request or from an identifier of the user with the help of a said first encryption key held by the terminal; and the authentication process comprises decrypting the first authentication data with the help of a said first encryption key held by the server; and wherein said at least one second authentication parameter for authenticating the entity comprises at least a second encryption key comprising a secret key held by the terminal and by the platform, or a private and public key pair held respectively by the terminal and by the platform;

the access request from the terminal further includes second authentication data for authenticating the entity as generated from at least a portion of the access request or from an identifier of said client entity with the help of a said second encryption key held by the terminal; and the request derived from the access request from the terminal includes said second authentication data and third authentication data generated with the help of a third encryption key held by the server.

13. The method of claim 1, wherein a distinct access control model is utilized for each client entity.

14. The method of claim 13 wherein said distinct access control models are RBAC or OrBAC.

15. A computer having stored thereon instructions, which when executed by said computer, cause a server situated between a terminal of a user who is one of a plurality of users attached to a client entity which is one of a plurality of client entities and a platform of a cloud computer service supplier, the cloud computer service supplier providing to a plurality of distinct client entities corresponding distinct sets of resources to perform a processing method for processing an access request from said terminal of said user to a computer resource selected from a set of computer resources made available to said client entity by said platform of a cloud computer service supplier, said processing method comprising, on the access request being received by the server:

authenticating said user who is one of a plurality of users attached to said client entity which is one of said plurality of client entities with the help of at least a first authentication parameter for authenticating the user with the server;

verifying that the user is authorized to access said computer resource selected from said set of computer resources via said terminal by applying to said user and to said resource an access control model and an access control policy corresponding to said model, which model and policy are supplied to said server by said client entity; and if the user is authorized to access the computer resource, sending to the platform a request derived from the access request on the basis of at least one second authentication parameter for authenticating the client entity with the platform wherein said server uses distinct authentication and authorization instructions for each client entity from among said plurality of client entities; or else rejecting the access request.

16. The computer of claim 15, wherein a distinct access control model is utilized for each client entity in said processing method.

17. The computer of claim 16 wherein said distinct access control models are RBAC or OrBAC.

18. A non-transitory computer readable data medium having stored thereon a computer program including instructions which, when executed by a computer, cause a server situated between a terminal of a user who is one of a plurality of users attached to a client entity which is one of a plurality of client entities and a platform of a cloud computer service supplier, the cloud computer service supplier providing to a plurality of distinct client entities corresponding distinct sets of resources to perform a processing method for processing an access request from said terminal of said user to a computer resource selected from a set of computer resources made available to said client entity by said platform of a cloud computer service supplier, said processing method comprising, on the access request being received by the server:

authenticating said user who is one of a plurality of users attached to a client entity which is one of a plurality of client entities with the help of at least a first authentication parameter for authenticating the user with the server;

verifying that said user is authorized to access said computer resource selected from a set of computer resources via said terminal by applying to said user and to said resource an access control model and an access control policy corresponding to said model, which model and policy are supplied to said server by said client entity; and if the user is authorized to access the computer resource, sending to the platform a request derived from the access request on the basis of at least one second authentication parameter for authenticating the client entity with the platform wherein said server uses distinct authentication and authorization instructions for each client entity from among said plurality of client entities; or else rejecting the access request.

19. A server situated between a terminal of a user who is one of a plurality of users attached to a client entity which is one of a plurality of client entities and a platform of a cloud computer service supplier, the cloud computer service supplier providing to a plurality of distinct client entities corresponding distinct sets of resources selected from a set of computer resources, said server comprising a processor configured to execute instructions which cause said server to authenticate and authorize said client entity, wherein said instructions, when executed by said processor cause said server to:

authenticate said user who is one of a plurality of users attached to a client entity which is one of said plurality of client entities on receiving a request from said terminal to access a computer resource made available to said client entity, said authentication using at least a first authentication parameter for authenticating the user with the server;

verify that said user is authorized to access said computer resource selected from said set of computer resources via said terminal by applying to said user and to said resource an access control model and an access control policy corresponding to said model, which model and policy are supplied to said server by said client entity;

if the user is authorized to access said computer resource, send to the platform a request that is derived from the access request on the basis of at least a second authentication parameter for authenticating the client entity with the platform wherein said server uses distinct authentication and authorization instructions for each client entity from among said plurality of client entities; and reject the access request if the user is not authorized to access said computer resource.

20. A server according to claim 19, wherein said access control model used by said verification entity is derived from a metadata file describing elements defining said model and a structure of said elements.

21. A server according to claim 19, wherein said processor is further configured to execute instructions which cause said server to detect a change in said model or said access control policy into a new model or a new access control policy, and to obtain said new model or said new access control policy in order to use it during the verification process.

22. A server according to claim 19, wherein for each client entity:
- said at least one first authentication parameter comprises at least a first encryption key comprising a secret key held by the terminal and by the server or a private and public key pair held respectively by the terminal and by the server;
- said at least one second authentication parameter for authenticating the client entity comprises at least one second encryption key comprising a secret key held by the terminal and by the platform or a private and public key pair held respectively by the terminal and by the platform;
- the access request from the terminal includes first authentication data generated from at least a portion of the access request or an identifier of the user with the help of a said first encryption key held by the terminal, and second authentication data generated from at least a portion of the access request or an identifier of the client entity with the help of a second encryption key held by the terminal;
- the first authentication data is decrypted with the help of a said first encryption key held by the server; and
- the derived request includes said second authentication data and third authentication data generated with the help of a third encryption key held by the server.

23. A system comprising:
- a server according to claim 22; and
- a platform of a computer service supplier making computer resources available to at least one client entity wherein said computer resource is selected from a set of computer resources and wherein said client entity is one of a plurality of client entities, the platform comprising a processor configured to execute instructions which cause said platform to:
- perform a validation process comprising:
  - receiving a request derived by a server from an access request from a terminal of a user who is one of a plurality of users attached to said client entity requesting access to a said computer resource made available to said client entity, said server being situated between the terminal and the platform; and
- perform an authentication process comprising:
  - decrypting third authentication data with the help of an encryption key held by the platform and associated with the third encryption key held by the server; and
  - decrypting second authentication data with the help of a said second encryption key held by the platform; and
- to supply said computer resource to said terminal wherein said cloud computer service supplier provides to said plurality of distinct client entities corresponding distinct sets of resources;
- wherein said server is situated between a terminal of a user who is one of a plurality of users attached to said client entity which is one of a plurality of client entities and said platform of a cloud computer service supplier for making a computer resource selected from said set of computer resources available to at least one client entity which is one of said plurality of client entities, said server comprising a processor configured to execute instructions which cause said server to authenticate and authorize said client entity, wherein said instructions, when executed by said processor cause said server to:
- authenticate said user who is one of a plurality of users attached to said client entity which is one of a plurality of client entities, on receiving a request from said terminal to access said computer resource selected from said set of computer resources, said authentication using at least a first authentication parameter for authenticating the user with the server;
- verify that said user is authorized to access said computer resource selected from said set of computer resources via said terminal by applying to said user and to said resource an access control model and an access control policy corresponding to said model, which model and policy are supplied to said server by said client entity;
- if the user is authorized to access said computer resource, send to the platform a request that is derived from the access request on the basis of at least a second authentication parameter for authenticating the client entity with the platform wherein said server uses distinct authentication and authorization instructions for each client entity from among said plurality of client entities; and
- reject the access request if the user is not authorized to access said computer resource; and wherein for each client entity requesting authentication and authorization by said server:
- said at least one first authentication parameter comprises at least a first encryption key comprising a secret key held by the terminal and by the server or a private and public key pair held respectively by the terminal and by the server;
- said at least one second authentication parameter for authenticating the client entity comprises at least one second encryption key comprising a secret key held by the terminal and by the platform or a private and public key pair held respectively by the terminal and by the platform;
- the access request from the terminal includes first authentication data generated from at least a portion of the access request or an identifier of the user with the help of a said first encryption key held by the terminal, and second authentication data generated from at least a portion of the access request or an identifier of the client entity with the help of a second encryption key held by the terminal;
- the first authentication data is decrypted with the help of a said first encryption key held by the server; and
- the derived request includes said second authentication data and third authentication data generated with the help of a third encryption key held by the server.

24. A system comprising:
- a platform of a cloud computer service supplier making computer resources available to at least one client entity; and
- a server according to claim 19, situated between said platform of said service supplier and a terminal from which an access request originates requesting access to a said computer resource made available to said client entity by said platform of the service supplier.

25. A platform of a computer service supplier making computer resources available to at least one client entity wherein said computer resource is selected from a set of computer resources and wherein said client entity is one of a plurality of client entities, the platform comprising a processor configured to execute instructions which cause said platform to:
- perform a validation process comprising:
  - receiving a request derived by a server from an access request from a terminal of a user who is one of a plurality of users attached to said client entity requesting access to a said computer resource made available to said client entity, said server being situated between the terminal and the platform; and perform an authentication process comprising:

decrypting third authentication data with the help of an encryption key held by the platform and associated with the third encryption key held by the server; and decrypting second authentication data with the help of a said second encryption key held by the platform; and to supply said computer resource to said terminal wherein said cloud computer service supplier provides to said plurality of distinct client entities corresponding distinct sets of resources;

wherein said server is situated between a terminal of a user who is one of a plurality of users attached to a client entity which is one of a plurality of client entities and a platform of a cloud computer service supplier for making a computer resource selected from a set of computer resources available to at least one client entity which is one of said plurality of client entities, said server comprising a processor configured to execute instructions which cause said server to authenticate and authorize said client entity, wherein said instructions, when executed by said processor cause said server to:

authenticate said user who is one of a plurality of users attached to said client entity which is one of a plurality of client entities, on receiving a request from said terminal to access said computer resource selected from said set of computer resources, said authentication using at least a first authentication parameter for authenticating the user with the server;

verify that said user is authorized to access said computer resource selected from said set of computer resources via said terminal by applying to said user and to said resource an access control model and an access control policy corresponding to said model, which model and policy are supplied to said server by said client entity;

if the user is authorized to access said computer resource, send to the platform a request that is derived from the access request on the basis of at least a second authentication parameter for authenticating the client entity with the platform wherein said server uses distinct authentication and authorization instructions for each client entity from among said plurality of client entities; and reject the access request if the user is not authorized to access said computer resource; and wherein for each client entity requesting authentication and authorization by said server:

said at least one first authentication parameter comprises at least a first encryption key comprising a secret key held by the terminal and by the server or a private and public key pair held respectively by the terminal and by the server;

said at least one second authentication parameter for authenticating the client entity comprises at least one second encryption key comprising a secret key held by the terminal and by the platform or a private and public key pair held respectively by the terminal and by the platform;

the access request from the terminal includes first authentication data generated from at least a portion of the access request or an identifier of the user with the help of a said first encryption key held by the terminal, and second authentication data generated from at least a portion of the access request or an identifier of the client entity with the help of a second encryption key held by the terminal;

the first authentication data is decrypted with the help of a said first encryption key held by the server; and the derived request includes said second authentication data and third authentication data generated with the help of a third encryption key held by the server.

\* \* \* \* \*